(12) United States Patent
Nielsen et al.

(10) Patent No.: US 8,139,623 B2
(45) Date of Patent: Mar. 20, 2012

(54) METHOD OF CONTROLLING OPERATION OF AT LEAST ONE TRANSMITTER AND/OR ONE RECEIVER, COMMUNICATION SYSTEM AND USE OF SUCH A METHOD OR SUCH A SYSTEM

(75) Inventors: Martin Sandal Nielsen, Nørre Nebel (DK); Henning Sørensen, Lem (DK)

(73) Assignee: VKR Holding A/S (DK)

( * ) Notice: Subject to any disclaimer, the term of this patent is extended or adjusted under 35 U.S.C. 154(b) by 893 days.

(21) Appl. No.: 10/526,092

(22) PCT Filed: Sep. 26, 2003

(86) PCT No.: PCT/DK03/00633
§ 371 (c)(1),
(2), (4) Date: Jan. 9, 2006

(87) PCT Pub. No.: WO2004/030251
PCT Pub. Date: Apr. 8, 2004

(65) Prior Publication Data
US 2006/0099980 A1  May 11, 2006

(30) Foreign Application Priority Data
Sep. 26, 2002 (EP) .................................. 02079058

(51) Int. Cl.
*H04B 1/38* (2006.01)
*H04J 3/00* (2006.01)

(52) U.S. Cl. ........ 375/219; 370/311; 370/328; 370/336; 370/337; 370/345; 370/350; 455/522

(58) Field of Classification Search ............... 370/317, 370/336, 338, 311, 312, 328, 345, 350; 375/219; 455/458, 507, 522
See application file for complete search history.

(56) References Cited

U.S. PATENT DOCUMENTS

| | | | | |
|---|---|---|---|---|
| 6,570,857 | B1 * | 5/2003 | Haartsen et al. | 370/312 |
| 7,231,221 | B2 * | 6/2007 | Assarsson et al. | 455/458 |
| 2003/0128685 | A1 * | 7/2003 | Mahany et al. | 370/338 |
| 2003/0231607 | A1 * | 12/2003 | Scanlon et al. | 370/338 |

FOREIGN PATENT DOCUMENTS

| | | |
|---|---|---|
| CA | 2 337 118 | 5/2000 |
| EP | 0 529 269 | 3/1993 |

(Continued)

OTHER PUBLICATIONS

Ren Keqiang; Liu Changshi; 1994-2008 China Academic Journal Electronic Publishing House; "Effective Algorithm solving Retransmission Ambiguity of TCP Protocol"; pp. 25-29; First Issue Published 1993, Communication Technology, including English Abstract.

*Primary Examiner* — Khanh C Tran
*Assistant Examiner* — Eboni Hughes
(74) *Attorney, Agent, or Firm* — Cantor Colburn LLP (57) ABSTRACT

Method of and communication system for controlling operation of at least one transmitter and/or one receiver in a communication system, e.g. a system for transmission of control signals, request signals, interrogation signals etc. wherein a signal comprising a message frame transmitted from a transmitter to a receiver comprises a message part indicative of the time of transmission for a later signal.

35 Claims, 4 Drawing Sheets

FOREIGN PATENT DOCUMENTS

| | | |
|---|---|---|
| EP | 0 748 085 | 12/1996 |
| GB | 2 086 106 | 5/1982 |
| JP | 05-207020 | 8/1993 |
| JP | 2002-171261 | 6/2002 |
| WO | 92/19059 | 10/1992 |
| WO | 99/46745 | 9/1999 |
| WO | 00/28776 | 5/2000 |
| WO | 02/47321 | 6/2002 |

* cited by examiner

METHOD OF CONTROLLING OPERATION OF AT LEAST ONE TRANSMITTER AND/OR ONE RECEIVER, COMMUNICATION SYSTEM AND USE OF SUCH A METHOD OR SUCH A SYSTEM

FIELD OF THE INVENTION

The invention relates to a method of controlling operation of at least one transmitter and/or one receiver in a communication system, e.g. a system for transmission of control signals, request signals, interrogation signals etc.

The invention also relates to a communication system comprising at least one transmitter and one receiver, e.g. a system for transmission of control signals, request signals, interrogation signals etc.

Further, the invention relates to uses of the method and/or the system according to the invention.

BACKGROUND OF THE INVENTION

In systems wherein one- or two-way communication is performed between nodes, e.g. units, apparatus, etc. by means of wireless transmission, for example radio frequency transmission, it is of importance that a node, e.g. an apparatus, will be able to receive a transmitted signal, e.g. a message, a dataframe etc. where such a signal has been transmitted from e.g. another node in the system. Normally, this is achieved by letting the node in questions be in a receive mode constantly, e.g. by having all necessary circuits and in particular the radio frequency circuits be active continuously. This will of course contribute significantly to the total power consumption of the node in question.

Therefore, there is a need to design and/or operate such systems and nodes utilized in such systems in a manner, whereby power consumption is reduced. This need is enhanced owing to the fact that many of the nodes involved in such systems rely on power supply systems where maximum power, rating and/or capacity are limited, such as battery power supply.

Further, the need to be able to establish a communication to or between nodes without time delay or without an unacceptable time delay, e.g. unacceptable in the specific circumstances, must be kept in mind when designing such systems and/or methods for operation.

WO 00/28776 A1 relates to a method for operating a transmitter and receiver units in a control system. In order to reduce the power consumption of the receiver units one or each of these is activated at a specific interval in time, which is synchronized with the transmission cycle of the transmission unit. The transmission unit transmits in intervals, e.g. 300 msec, with a predetermined and fixed distance, e.g. four minutes, between the transmission intervals. If a transmission unit transmits to a number of receiver units, the distances between the transmit intervals corresponding to the respective receiver units may differ from each other, but the distance between intervals for a specific receiver unit will be fixed. The regular signals transmitted from the transmitter to the receiver unit does not comprise information concerning the distance between intervals, but a special synchronization signal containing information regarding the distance is transmitted by the transmitter halfway between intervals. Thus, if a receiver unit falls out of synchronicity it will stay active until such a synchronization signal is received. The receiver will then be able to determine the next interval where it must be active, i.e., as half of the fixed distance, e.g. two minutes when the fixed distance is four minutes, measured from the time of reception of the synchronization signal.

Thus it is apparent that the prior art of WO 00/28776 A1 is related only to energy-savings for the receiver unit(s) and not the transmitter unit. Further, the transmitter must be arranged to transmit separate synchronization signals during every period and at a specific time, i.e. exactly between the regular transmit intervals. Further, it is noted that the transmission frequency as well as the distance between transmittals is fixed for this prior art system. WO 99/46745 A2 relates to a method of transmitting data from several first stations to a second station. According to the method the transmissions are arranged in time windows that are repeated consecutively. In these time windows slots are arranged, i.e. a first and a second slot for transmission of a synchronization message and a selection message, respectively, from the second station. The synchronization message serves to synchronize clocks of the first stations with the clock of the second station. The selection message serves to transmit identification of the first stations and corresponding slots for transmittals of data from these. These slots for transmittals of data from the first stations follow immediately after the selection message. In these slots the respective first stations transmit data to the second station in their respective slots. Each first station thus has to be active during the first and the second slot for transmission of a synchronization message and a selection message. Hereafter each first station may switch off its receiver, while its transmitter needs to be active at the allotted response time slot. After having transmitted data to the second station at this time slot from the first station in question this station may switch off its transmitter again. When a new time window begins immediately after the end of the time window in question, the receivers of the first stations need to be active again. According to another embodiment further slots are included wherein command message slots are included between the selection message slot and the response slots. In these slots information regarding the response time slots are given and in addition further instructions may be given to the first stations.

Thus, this prior art system requires that general synchronization messages are transmitted for each cycle and thus requires that the receivers of the first stations are active/switched on while the synchronization messages are transmitted. Further, these receivers need to be switched on for the following selection message slot as well. Thus all receivers must be active also in cases where no information has to be transmitted to the first station in question or no response is needed from the first station in question. Further it is noted that the second station must always be activated. Finally, because of the cyclic nature of the system, a certain power drain will be present for transmission and reception of synchronization and selection messages, even in cases where activity is not required or is restricted.

EP 0 529 269 A2 relates to a method and an apparatus for controlling a wireless link adapter of a battery powered computer in order to conserve battery power. A multi-access protocol is used in which time is divided into fixed-length frames, and these frames are divided into slots. A frame, which is repeated cyclically, is divided into three subframes, one for transmission of data packets from a base station to mobile units, and two for allowing transmission the other way. Each subframe has a header wherein the mobile units are allotted a slot each. Thus, in the first subframe, the receiver of a mobile unit need only to be active in the allotted slot and correspondingly for the transmitter in the following two subframes. Thus, the drain on the batter power is reduced. However, as mentioned above, synchronization must be performed repeatedly and the receiver must be turned on for each header even in cases where there is no need to transmit to or from the mobile unit in question.

EP 0 748 085 A1 relates to a system comprising a number of battery powered mobile units, one of which is designated as a master unit, and the rest are designated as slave units. Communication between the master unit and the slave units, i.e. communication in order to assess whether the respective slave units are still present, takes place cyclically with periods of a considerably and fixed length, e.g. a time window of one hour divided into sub-windows of 20 minutes length. The slave units have each been allocated a slot and need only be active in their respective slot, whereby battery drain is reduced for slave units. However, as mentioned above, the transmitted information is limited to information regarding presence or not. Further all slave units need to be activated every period, and also due to the fixed length of period and the considerable length of the cycle, this prior art system has limited application possibilities.

BRIEF SUMMARY OF THE INVENTION

The present invention provides in one aspect an improved method of controlling operation of at least one transmitter and/or one receiver in a communication system. Thus, the invention also provides a method of controlling operation of at least one transmitter and/or one receiver in a communication system as specified above, by which communication between at least two nodes, e.g. one and/or two-way communication, in a system may be performed in a manner providing reduction in power consumption.

Further, the present invention provides in another aspect a communication system comprising at least one transmitter and one receiver, e.g. a system for transmission of control signals, request signals, interrogation signals etc. which allows communication to be performed in a power saving manner.

The invention in another aspect also provides such a method and such a system for transmission of signals as specified above by communication that may be established reliably and without unacceptable time delay.

Such a method and a system will make it possible to lower power consumption remarkably in relation to normal mode operation and in relation to prior art power saving systems.

In yet a further aspect of the invention, such a method and a system make it possible to establish transmission and/or reception of data in a flexible manner and allowing communication to be performed selectively.

Additionally, a method and a system according to yet another aspect of the invention avoids the need to operate periodically and transmit synchronization messages periodically.

The invention presents many advantageous uses for such methods and/or such systems as briefly introduced above.

In the following, a number of operating modes will be referred to when describing and claiming the invention. To clarify these matters, these modes will be briefly mentioned here.

A transmitter may operate in two modes, namely a normal active mode, e.g. transmitting or prepared to transmit, and a sleep mode, in which some parts of the transmitter and in particular the radio frequency circuit(s) or part hereof is—more or less—deactivated.

A receiver may operate in two modes, namely a normal active mode, e.g. receiving or prepared to receive, and a sleep mode, in which some parts of the receiver and in particular the radio frequency circuit(s) or part hereof is—more or less—reactivated.

A transceiver may similarly operate in two modes, namely a normal active operating mode, e.g. transmitting/receiving or prepared to transmit or receive, and a sleep mode, in which some parts of the transceiver and in particular the radio frequency circuit(s) or part hereof is—more or less—deactivated.

Accordingly, a system comprising at least a transmitter and a receiver may be in a normal operating mode, wherein the at least one transmitter and the at least one receiver are in normal active mode constantly.

Further, such a system may be in a power saving mode, wherein the transmitter and/or the receiver (and/or a transceiver, if comprised in the system) may be in a sleep mode for a period of time. The invention relates to systems and methods having such features. A particular embodiment of such a system will be referred to in the following as a long preamble mode system, e.g. operating in accordance with a long preamble mode, while another particular embodiment will be referred to as time controlled poll mode system, e.g. operating in accordance with a time controlled poll mode.

The invention relates to a method of controlling operation of at least one transmitter and/or one receiver in a communication system, e.g. a system for transmission of control signals, request signals, interrogation signals etc. wherein a signal comprising a message frame transmitted from a transmitter to a receiver comprises a message part indicative of the time of transmission for a later signal, and whereby a transition of said least one transmitter and/or one receiver from and/or into a power saving state is facilitated.

Hereby, it is achieved that one or both of the nodes involved, e.g. a master and a slave node may enter a sleep mode and still be able to engage in scheduled communication again. Thus, predetermined or prescheduled communication may be performed in a reliable manner providing several possibilities of lowering power consumption for one or both of the nodes involved. Obviously, such a method may be performed using two-way communication as well as one-way communication.

Further, by the method according to the invention, the need for having to transmit synchronization messages etc. regularly has been avoided, thus also lowering overall power consumption. It will also be understood that a high degree of flexibility is achieved for example, as regards the transmission pattern to different receivers or slave units, the length of the sleep mode periods, the selectivity when a number of different receivers or slave units is involved etc.

Preferably, the message part indicative of the time of transmission for a later signal, e.g. a later dataframe, may relate to the time of transmission for a following signal to be transmitted to the receiver. Hereby, the slave node may be able to enter sleep ode and remain in this mode for the whole period, whereby optimal power reduction may be achieved. However, it will be understood that—if found advantageous, the slave may be active in the time period in question, e.g. between the prescheduled transmissions, for example in accordance with another predetermined receive pattern.

Advantageously, the message part indicative of the time of transmission may relate to a period of time following the signal in question. Hereby the slave node as well as the master node may determine the next time of transmission by measuring the lapsed time from the time the message was received.

In one embodiment, the message part indicative of the time of transmission may relate to a point of time relating to a timing reference, e.g. a timing reference established at each node or at least at one of the nodes involved. Hereby, the next time of transmission may be determined in a simple manner, e.g. by using the commonly available timing means normally comprised in the nodes in question. It may be noted that the timing means may be synchronized regularly, e.g. every time a message is transmitted from a master to a slave, the timing reference of the master may be included in the message and the slave node may adjust its own timing reference, if necessary.

Advantageously, the transmitter may be brought into a special mode, e.g. a sleep mode, a power conserving mode, after having concluded transmission of the signal, preferably after receipt of a confirmation signal from the receiver. Hereby, a significant power saving may be achieved on the part of the transmitter, e.g. the master node. Obviously, a power saving may also be achieved in relation to a long preamble mode, in which the transmitter is programmed to transmit a preamble of a considerable length, e.g. 500 msec, every time a message has to be transmitted. In essence, the power consumption necessary for transmitting such a long preamble may thus be avoided, since according to the invention a preamble of only a relatively small length need to be transmitted.

In a further embodiment, the transmitter may be controlled to wait a predetermined time for a response from the receiver, and, if no response is received, to retransmit the signal. Hereby the reliability of the communication may be enhanced, since it will be detected that the transmitted message has not been properly received, and a new attempt is made. Further, it is noted that apart from serving as a confirmation message, the response from the receiver or the slave unit may comprise information, e.g. measured values etc. to the transmitter or master unit.

Advantageously, the transmitter may be controlled to retransmit the signal a predetermined number of times, if no response is received. Hereby a reliable communication form is achieved while simultaneously it is assured that attempts of establishing a communication are not continued, e.g. in cases where the transmission path to the receiver has been blocked.

The transmitter in this aspect of the invention may be controlled to be brought into normal operating mode at—or before—the time of transmission indicated by the message part. Hereby, the master may be in a sleep mode for essentially the whole period between transmitted messages.

In a further embodiment, the receiver may be brought into a special mode, e.g. a sleep mode, a power conserving mode, after having received the signal, preferably after having transmitted a confirmation signal and possibly after a further retransmission time. Hereby, a significant power saving may be achieved on the part of the receiver, e.g. the slave node. Obviously, a power saving may also be achieved in relation to a long preamble mode, in which the receiver is programmed to be active in a receive slot, e.g. for 10 msec, during every period corresponding to a long preamble, e.g. 500 msec. Thus, in the long preamble mode, the receiver has to be active for at least 10/500 of the time. However, in the time control poll mode, the active time and thus also the power consumption may be reduced by e.g. a factor 1000, all depending on the actual use and transmit/receive pattern in question.

The receiver in this aspect of the invention may be controlled to transmit a confirmation signal after having received the signal from the transmitter, and the receiver will subsequently wait in a receive mode for a retransmission from the transmitter. Hereby the reliability of the communication may be enhanced, since it will be detected by the receiver if the transmitted confirmation message has not been properly received by the master unit, i.e. a retransmission will be received from the master unit, and a new attempt is made. Further, it is noted that apart from serving as a confirmation message, the response from the receiver or the slave unit may comprise information, e.g. measured values etc. to the transmitter or master unit.

Advantageously, the receiver will wait in the receive mode for a period of time corresponding to at least a transmission slot for the transmitter before entering the special mode. If no retransmission has been received from the master unit during this interval, it is construed as a confirmation that the master unit has received the confirmation signal and any included data properly.

Advantageously, the receiver may be controlled to be brought into normal operating mode at—or before—the time of transmission indicated by the message part. Hereby, the slave may be in a sleep mode for essentially the whole period between the transmitted messages.

In a yet another embodiment, the method may comprise steps of resuming synchronization, e.g. in case the receiver has not received the time indicative message part or in case the transmitter has not received confirmation from the receiver of receipt of the time indicative message part. Hereby, a reliable communication method is established.

Advantageously, the steps of resuming synchronization may comprise the step of altering the operating mode of the transmitter until a communication has been established with the receiver, where after normal operating mode may be resumed. Hereby, for example by altering the operation mode of the master node to a long preamble mode, synchronicity may be regained effectively and relatively quickly, thereby minimizing the error time.

In a further aspect of the invention, the steps of resuming synchronization may comprise the step of altering the operating mode of the transmitter unit to a long preamble mode. The transmitter will transmit a preamble of a length that will ensure—in most cases—that the receiver or the receivers in question will enter receive mode during this preamble. The preamble contains information regarding the point in time, when the payload data of the message will be transmitted, and the receiver may operate in accordance herewith, i.e. regarding synchronicity.

The steps in this aspect of resuming synchronization may comprise the step of altering the operating mode of the receiver until a communication has been established with the transmitter, whereafter normal operating mode may be resumed. The receiver may alter its operation mode to a constant receive mode until a signal, e.g. a preamble is received from the transmitter or master unit.

Advantageously, the steps of resuming synchronization may comprise the step of altering the operating mode of the receiver unit to a long preamble mode, whereby synchronicity may be regained while simultaneously limiting the power consumption of the receiver unit or units.

In an advantageous embodiment, the special mode of the transmitter and/or the receiver may comprise a sleep mode, e.g. a low power consumption mode of a radio frequency operating part, e.g. a radio frequency transmitter or a receiver, respectively. It will be understood, though, that other parts than the radio frequency parts may be brought into sleep mode, e.g. parts not necessary for the timing and for the reactivation.

Advantageously, the at least one transmitter and/or at least one receiver may each form part of a node comprising a transceiver arrangement. Although the invention may relate to a system comprising nodes performing by one-way communication, it will be understood that master as well as slave nodes may comprise transceiver arrangements, which also will be apparent from the specific examples given in the detailed description.

Further, the communication system may comprise at least two nodes, each comprising at least a transmitter and/or receiver for wireless transmission, e.g. radio frequency transmission. It will be understood that other means of transmission other than radio frequency may be utilized. Further, it will be understood that the invention may be utilized in connection with systems comprising a plurality of master and/or slave nodes.

In still a further advantageous embodiment, the time of transmission for a later signal may be selected randomly, preferably from a predetermined interval. Hereby the risk of collision is reduced in a system comprising more than one transmitter or master unit.

The invention also relate to a communication system comprising at least one transmitter and one receiver, e.g. a system for transmission of control signals, request signals, interrogation signals etc. wherein the at least one transmitter is designed to be able to include a message part indicative of the time of transmission for a later signal when transmitting a signal to the at least one receiver, and wherein the system comprises means for facilitating a transition of the at least one transmitter and/or one receiver from and/or into a power saving state in dependence on the message part indicative of the time of transmission for a later signal.

Hereby, it is achieved that one or both of the nodes involved, e.g. a master and a slave node may enter a sleep mode and still be able to engage in scheduled communication again. Thus, predetermined or prescheduled communication may be performed in a reliable manner providing several possibilities of lowering power consumption for one or both of the nodes involved. Obviously, such a system may operate using two-way communication as well as one-way communication.

Further, means for facilitating transmission of synchronization messages etc. regularly has been avoided by the system, thus also lowering overall power consumption. It will also be understood that a high degree of flexibility is achieved according to this aspect of the invention, for example, as regards the transmission pattern to different receivers or slave units, the length of the sleep mode periods, the selectivity when a number of different receivers or slave units is involved, etc.

When the at least one transmitter and/or one receiver comprise timing means, the message part indicative of the time of transmission for a later signal may be made readily available to the transmitter and the message part may be readily utilized by the receiver for operative purposes. Hereby, the next time of transmission may be determined in a simple manner, e.g. by using the commonly available timing means normally comprised in the nodes in question. It may be noted that the timing means may be synchronized regularly, e.g. every time a message is transmitted from a master to a slave, the timing reference of the master may be included in the message and the slave node may adjust its own timing reference, if necessary.

In an advantageous embodiment, the at least one receiver may comprise control means for switching between at least two modes of operation in dependence on a received message part indicative of the time of transmission for a later signal. Hereby the altering of the operative modes may be achieved in a relatively simple manner.

In a further advantageous embodiment, the at least one transmitter may comprise control means for switching between at least two modes of operation in dependence on a transmitted message part indicative of the time of transmission for a later signal. Hereby the altering of the operative modes may be achieved in a relatively simple manner.

The at least two modes of operation in this aspect of the invention may comprise a normal operating mode and a sleep mode, e.g. a power-conserving mode. It will be understood, though, that other modes may be involved and that more than two modes may be selectable.

In a still further advantageous embodiment, the sleep mode, e.g. a power conserving mode of the transmitter and/or the receiver may comprise sleep mode, e.g. a low power consumption mode of a radio frequency operating part, e.g. a radio frequency transmitter or a receiver, respectively. It will be understood, though, that other parts than the radio frequency parts may be brought into sleep mode, e.g. parts not necessary for the timing and for the reactivation.

When the at least one transmitter and/or the at least one receiver comprises battery power supply means, a particular advantageous embodiment has been achieved, since the resulting low power consumption of the transmitter and/or receiver will provide a prolonged operative life of the power supply, thereby giving enhanced reliability and user-friendliness. Other supply systems may profit as well, though, when the invention is utilized, e.g. solar power operated systems.

In a particular advantageous embodiment, the at least one transmitter and/or the at least one receiver may comprise means, e.g. control means for determining a lack of synchronicity and means for initiating a synchronization resumption process. Hereby the system may quickly take measures to regain synchronicity, whereby a reliable communication may be maintained.

Advantageously, the system may be designed to operate in accordance with various methods according to the invention.

Finally, the invention pertains to a use of a method and/or a system for updating of measures values in e.g. control, request and/or interrogation systems. It will be understood that the invention is of particular importance when dealing with systems where very frequent communication is not necessary and where fast updating of e.g. measured valued, control signals, interrogation etc. is not necessary.

Further, the distance between polling times may be arranged arbitrarily, e.g. in view of the particular needs. At certain times the polling may be performed often, while at other times the polling may be performed with relatively large intervals. This may also take place individually for the receivers involved, e.g. with a relatively high polling frequency for certain receivers while others are polled at a lower frequency. Thus, a very flexible and individual operation is achieved and the need to perform cyclically transmissions of synchronization messages is made superfluous by the invention.

BRIEF DESCRIPTION OF THE FIGURES

The invention will be explained in further detail below with reference to the figures of which

DETAILED DESCRIPTION OF THE DRAWINGS

Detailed reference will now be made to the drawings in which examples embodying the present invention are shown. Repeat use of reference characters in the present specification and drawings is intended to represent same or analogous features or elements of the invention.

The drawings and the following detailed description provide a full and detailed description of the invention and the manner and process of making and using it, so as to enable one skilled in the pertinent art to make and use it. The drawings and detailed description also provide the best mode of carrying out the invention and are not meant as limitations of the invention. The present invention thus includes modifications and variations of the following examples as come within the scope of the amended claims and their equivalents.

Figure 1:
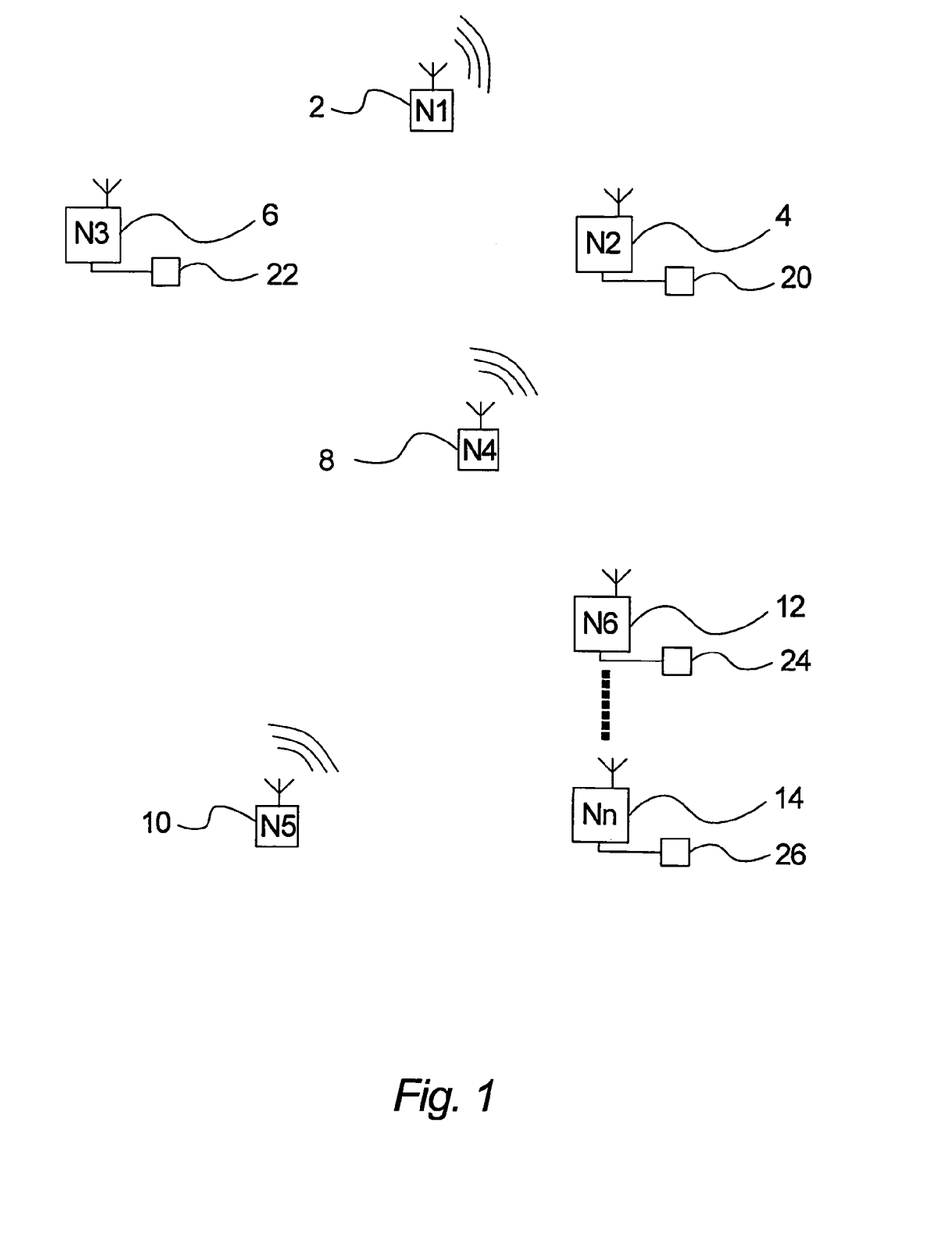
FIG. 1 shows a general overview of a system according to an embodiment of the invention.

FIG. 1 shows a general overview of a system according to an embodiment of the invention. The system comprises a plurality of nodes or units 2, 4, 6, 8, 10, 12, 14 (N1-Nn). Some or even all of these may comprise or be linked to devices, for example sensors, drive units for various apparatus and means, etc 20, 22, 24, 26. Such drive units may for example be activators of various types and may be used in a wide variety of applications, as explained in further detail later on.

The units N1-Nn may also or instead comprise or be linked to assorted apparatus, measuring devices, indicating devices, controllers etc. that need to receive information, control signals etc. at certain points of time. A common feature of the units 2, 4, 6, 8, 10, 12 is that it is necessary or advantageous to be able to send some sort of information, signal etc. to the units. Further, it may be necessary or preferable to be able to receive information or signals from the units, e.g. confirmation signals, acknowledgement signals, measurement signals etc.

In the embodiment shown in FIG. 1, the nodes or units 4, 6, 12, 14 are equipped with receiving means for radio frequency signals, e.g. including antenna means. Each of these nodes or units may comprise e.g. measuring means, sensors, one or more motor drive units or control units and may be connected to a driven or controlled member etc. It will be understood that these means may be integrated with the unit. It will further be understood that a system may comprise one or more of these nodes or units and that these may be similar or dissimilar and may control one or more similar or different devices. The nodes or units N2, N3, N6-Nn will also be referred to as controllable units or slave units in the following.

The system further comprises one or more nodes or units, e.g. 2, 8, 10 (N1, N4, N5) designed for transmission of signals by means of radio frequency transmission means or other types of wireless transmission. These nodes or units may be used for transmitting control signals or other types of signals to one or more of the other nodes or units in the system. The nodes N1, N4, N5, which may be remote controls, will also be referred to as controllers or master units in the following.

The method of performing a communication between the units or nodes comprised in the illustrated system, e.g. between a master node, e.g. the node 2 (N1), and one or more of the other nodes or units N2-Nn, which may be described as slave units in the following, will now be described in further detail. It will be understood that in this context a master unit will imply a unit or a node in a communication system that initiates a transmission of data, and that a slave unit correspondingly will imply a unit that receives and possibly responds to a transmission from a master unit. Thus, any of the units involved in the system illustrated in FIG. 1 may in principle take the role as a master unit as well as a slave unit in accordance with this definition. Further, it should be understood that the slave units will be able to respond to the received signals, e.g. by transmitting a response signal.

The transmission of signals, e.g. data between the nodes or units involved will take the form of a transmission of messages comprising a number of frames, packages or the like that are being transmitted between the units, e.g. a first frame from a first unit to a second unit, a second frame from the second unit to the first unit etc. A frame or a package comprises a number of bits that are transmitted consecutively. Each of the frames comprises a preamble part and a payload data part.

The operation of the nodes, e.g. the communication between these nodes and the operative modes of these nodes, e.g. normal active operating mode, sleep mode, and the operative modes of the system, e.g. normal active operating mode, a power saving mode such as time controlled poll mode, long preamble mode etc. will be described in the following with reference to FIGS. 2-4.

A node that initiates a transmission will be referred to as a master node or simply a master. A node that responds to received signal from a master, or a node that will only transmit upon request from master, will be referred to as a slave in the following.

Figure 2:
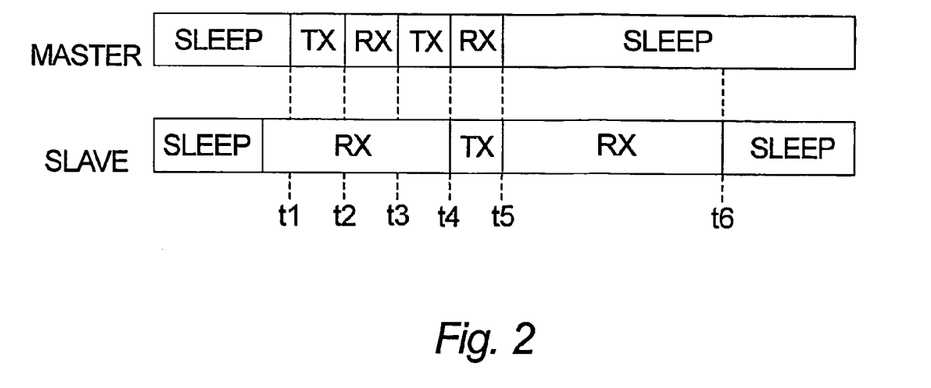
FIG. 2 is a functional diagram illustrating the communication between a master and a slave node as well as the function of these nodes according to an embodiment of the invention.

In FIG. 2 the functionality of a system comprising a master and a slave unit that are operating according to an embodiment of the invention, also referred to as time controlled poll mode, is illustrated. Prior to the time $t_1$, both are in a sleep mode, e.g. a mode wherein power consumption has been reduced in relation to the power consumption in a normal, fully operative mode. This may be achieved by deactivating circuits that need not be operable when no transmission needs to be performed or when no reception of signals is expected, such as radio frequency (RF) circuits. However, it will be understood that some parts or circuits, such as some control circuits, need to be operable at all time in order to be able to "wake up" a node. The selection of circuits or circuit parts to be deactivated will of course depend on the specific circumstances and the design of the node, apparatus and/or transmitter/receiver means in question.

At the time $t_1$, which has been indicated or specified by the master node to the slave node previously, the master node and the slave node will switch from sleep mode to a fully operable mode. As indicated, the slave node may initiate its transition from the sleep mode earlier than the master node in order to be able to receive a message transmitted immediately after the time $t_1$ from the master node. At the time $t_1$ the master unit transmits a dataframe in a transmit interval TX. This dataframe comprises, apart from a preamble and a message content relating to an ordinary command etc. destined for the slave node a message part indicating a later transmittal or preferably the next time, a signal or a polling will be transmitted to the slave node. This message part indicative of the next transmission time for a polling may for example be the absolute time for the transmission, measured in relation to a common time scale, or it may be a value indicating the time that will lapse before transmission is resumed. However, other means of indicating the later time of transmission may be utilized. For example, the later time of transmission may be provided by means of an algorithm known to at least the slave node, but preferably known to both the master node and the slave node. The master node may transmit a message, a sign, a character or the like, on the basis of which the slave node may calculate the later time of transmission, using the algorithm.

At the time $t_1$, the slave node is in a receive move (RX), however, in the example illustrated in FIG. 2, the dataframe transmitted by the master is not received by the slave. The master, which after the transmission has switched to a receive mode (RX) at the time $t_2$, will therefore not receive the expected confirmation signal from the slave. After a predetermined time, the master switches to a transmit mode (TX) again at the time $t_3$ and retransmits the dataframe. At the time $t_4$ the master switches to a receive mode (RX) and the slave, which this time has received the dataframe, will transmit- and receive-modes for the master may be repeated a predetermined number of times e.g. two or more than two. For practical reasons, however, the number of repetitions will be limited.

In the example shown in FIG. 2, the master has received the confirmation signal from the slave node, and at the time $t_5$ the master node will switch to sleep mode, e.g. by deactivating the radio frequency circuit(s) and possibly other circuits and circuit parts. The slave node will however remain in an active mode until the time $t_6$, corresponding to the predetermined number of repeated transmissions, since the slave node does not receive a confirmation from the master node. The slave node may therefore in the illustrated example stay active in case the master unit has not received the confirmation signal sent from the slave node at time $t_4$, waiting for possible retransmission(s) from the master node. At the time $t_6$ the slave node is brought into sleep mode, e.g. by deactivating the radio frequency circuit(s) and possibly other circuits and circuit parts.

The master node and the slave node will both be controlled to wake up in accordance with the message part indicative of the next transmittal, and the cycle described above will be repeated. It will be understood that both master and the slave will have control means to perform the time control and to perform the activation of the deactivated parts. These control means may of course also involve timing means, e.g. clock means etc. whereby the point of time for reactivation may be provided readily if the time for the next transmission has been indicated by a point in time or by a time period. The control means may also be involved if for instance the reactivation time has to be calculated using an algorithm.

Figure 3:
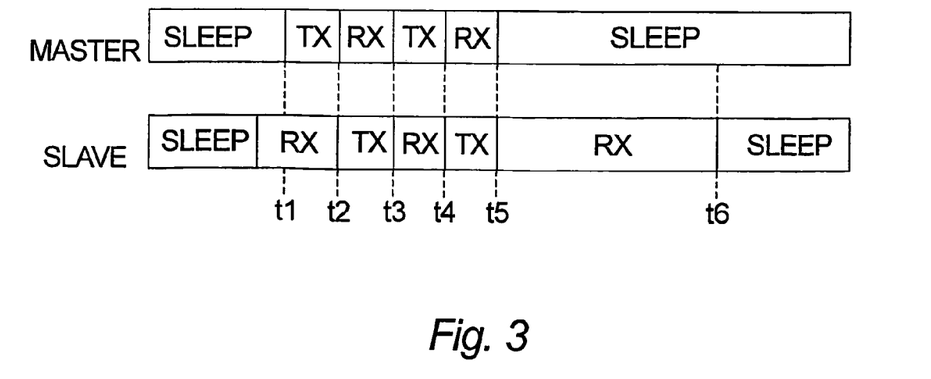
FIG. 3 shows a functional diagram corresponding to FIG. 2, but in a different operational situation.

The operative cycle illustrated in FIG. 3 corresponds to FIG. 2, but in FIG. 3 the confirmation signal sent from the slave node at the time $t_2$ is not received by the master node. The master node will thus in accordance with this embodiment of the invention perform a retransmittal of the signal at the time $t_3$. This signal is received by the slave node (again), and at the time $t_4$ the slave node has switched to transmit mode (TX) and transmits a confirmation signal again. This is received by the master node, which consequently, as explained above, is brought into sleep mode at the time $t_5$. The slave node will as explained above wait until the time $t_6$ before going into sleep mode.

It will be understood that power consumption on the part of the slave node may be reduced further by reducing the time wherein the slave is active waiting for possible retransmissions, e.g. the period from the time $t_2$ to the time $t_6$, or rather the period from a successful receipt of a signal from a master node and a transmittal of a confirmation signal until the time $t_6$.

In a modified embodiment of the invention, the slave node is controlled to initiate the sleep mode, when a signal from a master node has been received and a confirmation signal has been transmitted. Since the signal from the master node has been successfully received, e.g. the content of the dataframe has been received correctly, by the slave node, it is to be expected that the return confirmation signal will also be received by the master node. Thus, such a modified embodiment will perform with substantially the same or only a slightly lower degree of success than the first embodiment and will have a further enhanced power reduction.

Figure 4:
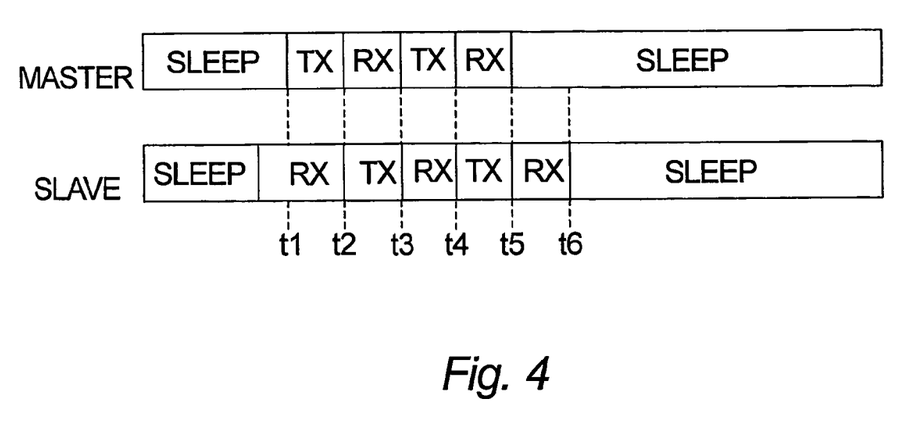
FIG. 4 shows a functional diagram corresponding to FIG. 2, but in a modified embodiment.

Another modified embodiment also having lower power consumption than the embodiment illustrated in FIG. 2 and 3, but with a higher degree of efficiency than the above-described modified embodiment is illustrated in FIG. 4.

In this embodiment the slave node is controlled in order to wait a number of receive slots, for example one, two etc. after having transmitted a confirmation signal before going into sleep mode.

As exemplified in FIG. 4, after master and slave node have been activated at the previously indicated time $t_1$, the master node has transmitted a signal, which has been correctly received by the slave node. The slave node has, as explained above, transmitted a return confirmation signal at the time $t_2$. This has however not been received by the master node, and consequently the master node has switched to transmit mode at the time $T_3$ and has transmitted a new signal. This retransmitted signal is—in the illustrated example—received by the slave node, which transmits a confirmation signal at the time $t_4$. The confirmation signal is received by the master node, which in accordance with the invention is brought into sleep mode at the time $t_5$. The slave node will as shown wait one receive slot, e.g. until the time $t_6$ before going into sleep mode. If the master node had not received the confirmation signal, it would have retransmitted the signal, and as the slave node is in receive mode in the respective time slot, it would have received the signal and would therefore not have been brought into sleep at the time $t_6$, but would have switched to transmit mode in order to transmit a confirmation signal again. In this manner, i.e. when the slave node is controlled to wait at least one receive slot before going into sleep mode, it will normally be assured that both nodes are aware of the next polling time, before going into sleep mode.

It is obvious, though, that a maximum allowable number of time slots must be decided upon, e.g. corresponding to the above mentioned predetermined number of retransmittals.

In the above described cases at lest one non-receipt of a signal has been involved, but it will be understood that if the signal from the master node in the first time slot after a sleep mode period is received by the slave node, and if the confirmation signal is received correctly by the master in the next time slot, then according to the invention the master will be brought into sleep mode e.g. at the time $t_3$. The slave node may, as exemplified above, be brought into sleep mode immediately, after at least one further time slot, or at a point in time corresponding to a predetermined number of retransmittals. Other embodiments and details hereof will be possible, which will be obvious to a skilled person.

Even though precautions have been taken, as described above, to assure that both nodes involved in the above-described time controlled poll mode method and system will receive information regarding the next polling time, unusual circumstances etc. may result in a lapse of synchronicity.

For example, the slave may not receive information regarding the next polling time, irrespective of the retransmittals, because the predetermined number of retransmittals has been exceeded before the message has been received (correctly). In this case it will be recognized by the control means both at the master and the slave node that the synchronization has been lost, i.e. that a new polling time has not been arranged or agreed upon, since the master has not received a confirmation from the slave and since the slave has not registered a message indicative of the next polling time.

In this case both nodes will change to another operational mode in order to establish a communication, whereby synchronization may be regained. For example, both nodes may switch to a long preamble mode.

Figure 5:
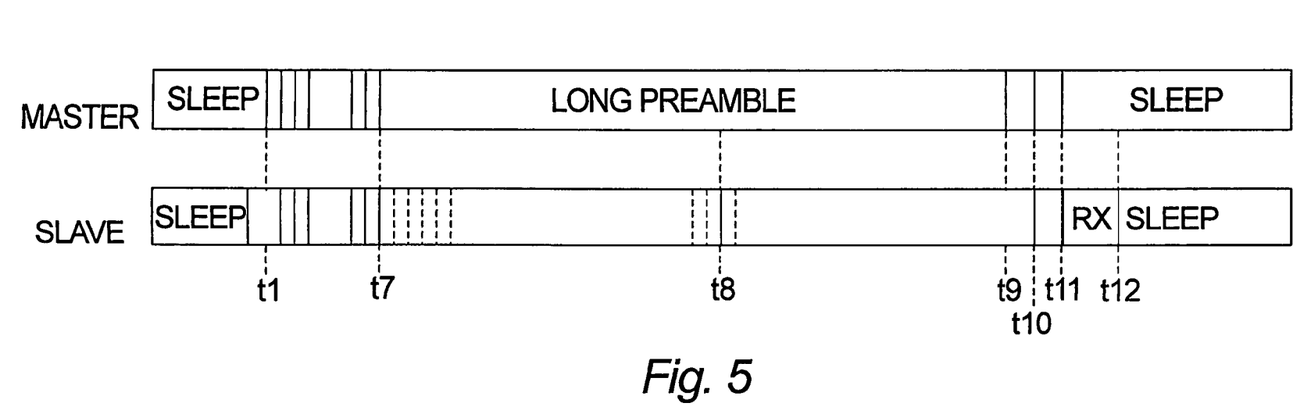
FIG. 5 is a functional diagram illustrating a method of regaining synchronicity according to an embodiment of the invention.

This has been exemplified in FIG. 5, which illustrates the functionality of a master and slave node in such an embodiment. At the time $t_1$ both nodes are operative after a sleep mode period and consecutive transmit and receive attempts are performed until the maximal predetermined number of slots have been reached at the time $t_7$. Both the master and the slave, or rather the control means of these will have recognized the error-situation and will change the operating mode of both nodes to a long preamble mode. As shown, the master will transmit a signal having a long preamble, followed by a payload frame at the time $t_9$. The long preamble allows prospective slaves to enter a receive mode in respective time slots. Thus, it is supposed that the slave node in question initiates a receive mode at the time $t_8$. It will detect the transmitted preamble from the master node, indicating that a communication is requested with the respective slave node, and the slave node will consequently remain in receive mode until the payload, which comprises a message part indicative of the next polling time, has been received at the time $t_{10}$. In the time slot from $t_{10}$ to the time $t_{11}$ the slave node will transmit a confirmation signal to the master node, which has switched to a receive mode. If the master node receives the confirmation signal (correctly), it will be brought into sleep mode as indicated. The slave node may, as explained previously, enter sleep mode immediately, after at least one further time slot, for example at the time $t_{12}$, or after a period corresponding to the predetermined number of retransmittals. It will be understood that synchronization has now been re-established.

Figure 6:
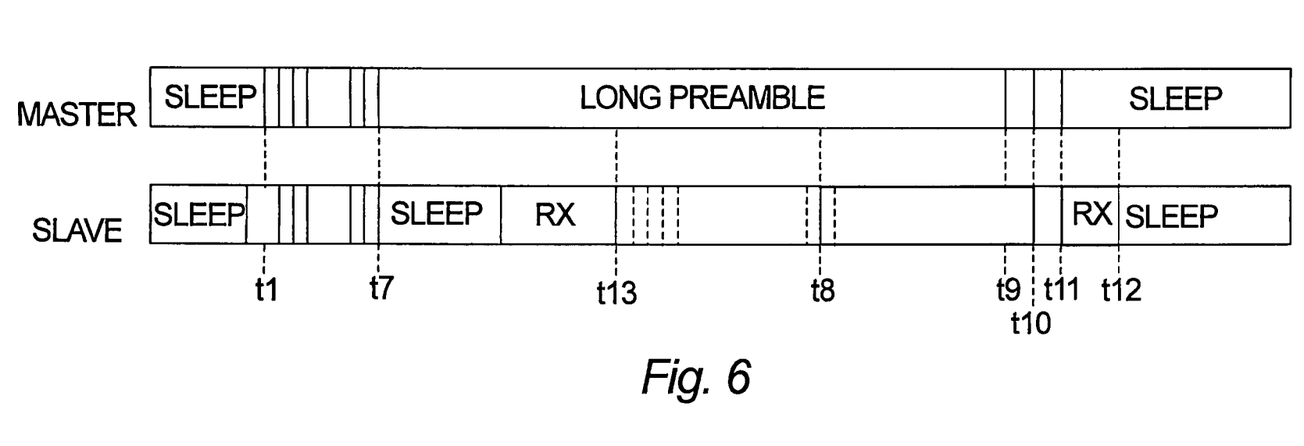
FIG. 6 is a functional diagram corresponding to FIG. 5, but illustrating another operational situation.

Another error-situation would occur if the slave node has received the next polling time, but the master node has not received a confirmation from the slave. This situation is illustrated in FIG. 6. At the time $t_1$ both nodes are operative as described above after a sleep mode period and consecutive transmit and receive attempts are performed until the maximal predetermined number of slots have been reached at the time $t_7$. Only the master, or rather the control means of the master node will have recognized the error-situation and will change the operating mode to a long preamble mode. As shown, the master will transmit a signal having a long preamble, followed by a payload frame at the time $t_9$. The slave node will, however, operate according to the time controlled poll mode and will enter the sleep mode, for example immediately after the time $t_7$ as illustrated. At the next polling time the slave node will enter receive mode, where it according to the time controlled poll mode will stay for the predetermined number of time slots, e.g. until the time $t_{13}$, since it has not received a message dataframe from the master node. The slave node or rather the control means of this will now have recognized that synchronicity has been lost and will switch to a long preamble mode as indicated. In the illustrated example the slave will enter a receive mode at the time $t_8$, it will detect the preamble transmitted from the master and will remain in receive mode until the payload has been receive at the time $t_{10}$. The slave node will as explained above in connection with FIG. 5 transmit a confirmation signal in a transmit mode from the time $t_{10}$ to the time $t_{11}$, and if this is received by the master node, both nodes will enter sleep mode, the slave node possibly after a receive mode period (RX) as illustrated. It will be understood that the slave node may not necessarily enter communication with the master node during the first long preamble transmitted from the master node. In this case both nodes will remain in the long preamble mode until communication has been regained.

Further, it will be understood that the communication performed after the time too, e.g. after a communication has been established using the long preamble mode may include several time slots of consecutive transmit and receive slots as explained in connection with FIGS. 2-4, depending on whether the respective signals are received correctly or not.

It will be understood that a master node may communicate with more than one slave node, and that that master node comprises means for avoiding possible time collision, e.g. by selecting different polling time values for the respective slave nodes. Further, the master node may be able to select polling time values randomly e.g. by selecting polling times between e.g. 250 sec and 350 sec, while maintaining a mean poll time value of e.g. 300 sec. In this manner the likelihood of collision will be avoided in a system comprising more than one master node.

Further, it will be understood that even if the invention has been described above using nodes capable of performing two-way communication, the invention may be utilized by systems comprising nodes only able to perform one-way communication. A few examples of this shall be explained in the following.

A transmitter in a one-way system may operate according to a long preamble mode, e.g. by sending a message frame comprising a long preamble of length of e.g. 500 msec. This will of course incur power consumption on the part of the transmitter that is higher than the power consumption in a corresponding two-way situation as described above. However, the message frame, e.g. the payload part of the frame will comprise data indicative of, e.g., the next transmission time, thereby allowing the receiver to enter a sleep mode after having received the message. The receiver will as described above be controlled to be reactivated at or immediately before the transmission time indicated in the preceding message, thus allowing a substantial power saving to be achieved. Such a system will as a whole achieve a power saving that is greater than the power saving achieved by e.g. a similar system operating according to a long preamble mode.

If synchronicity should be lost in such a system, e.g. if the receiver does not receive the next message (correctly) and therefore has not received information concerning the next time of transmission, the receiver may enter operation according to a long preamble mode, e.g. by being active for a short duration, e.g. 10 msec, during a long preamble period, e.g. 500 msec. The receiver remains in this mode until a message has been received from the transmitter comprising an indication of the next time of transmission. The receiver may now operate according to the time control poll mode again, e.g. enter sleep mode and be reactivated at the next time of transmission.

Alternatively, when synchronicity has been lost, both the transmitter and the receiver may operate according to normal operating mode, until synchronicity has been regained; e.g., until the receiver has received information regarding the next scheduled time of transmission. The slave node will have a higher power consumption than when operating according to long preamble mode, but the transmitter—the master—will have a lower power consumption than when operating according to a long preamble mode, since it will not have to transmit a fairly long preamble. Further, it may be expected that synchronicity may be regained fairly quickly in this manner, whereby the time controlled poll mode may be re-entered rather quickly again after a loss of synchronicity. Other optional operation schemes are possible when using the time control poll mode according to the invention in a one-way-system, which will be obvious to a skilled person.

The invention claimed is:

1. A method of controlling operation of at least one transmitter and/or one receiver in at least one node of a communication system for transmission of signals, the method comprising the steps of:
   transmitting a signal from a transmitter to a receiver on a non-periodical basis at a time indicated by a previous signal transmitted from the transmitter and received by the receiver, the transmitter signal including a message frame having a message part indicative of a time of transmission for a later signal;
   registering by the at least one receiver the message part indicative of the time of transmission for the later signal; and
   facilitating a transition of one of the at least one transmitter, the at least one receiver or both the transmitter and the receiver from and into a power saving state when no signal is being conveyed.

2. The method according to claim 1, wherein the message part indicative of the time of transmission for the later signal relates to the time of transmission for a following dataframe to be transmitted to the receiver.

3. The method according to claim 1, wherein the message part indicative of the time of transmission relates to a period of time following the transmitter signal.

4. The method according to claim 1, wherein the message part indicative of the time of transmission relates to a point of time relating to a timing reference established at least one of the nodes.

5. The method according to claim 1, further comprising the step of bringing the transmitter into a power conserving mode after transmission of the transmitter signal.

6. The method according to claim 5, further comprising the steps of controlling the transmitter to wait a predetermined time for a response from the receiver, and, if no response is received, retransmitting the transmitter signal.

7. The method according to claim 6, further comprising the step of controlling the transmitter to retransmit the transmitter signal a predetermined number of times if no response is received.

8. The method according to claim 5, wherein the transmitter is configured to be brought into normal operating mode at or before the time of transmission indicated by the message part.

9. The method according to claim 1, further comprising the step of bringing the receiver into a power conserving mode after having received the transmitter signal.

10. The method according to claim 9, further comprising the steps of transmitting a confirmation signal from the receiver after having received the signal from the transmitter, and waiting in a receive mode for a retransmission from the transmitter.

11. The method according to claim 10, wherein the receiver is configured to wait in the receive mode for a period of time corresponding to at least a transmission slot for the transmitter before entering the power conserving mode.

12. The method according to claim 9, wherein the receiver is configured to be brought into normal operating mode at or before the time of transmission indicated by the message part.

13. The method according to claim 1, further comprising the steps of resuming synchronization when the receiver has not received the time indicative message part or when the transmitter has not received confirmation from the receiver of receipt of the time indicative message part.

14. The method according to claim 13, further comprising the steps of altering the operating mode of the transmitter until a communication has been established with the receiver, and resuming normal operating mode thereafter.

15. The method according to claim 14, further comprising the step of altering the operating mode of the transmitter unit to a long preamble mode.

16. The method according to claim 13, further comprising the steps of altering the operating mode of the receiver until a communication has been established with the transmitter, and resuming normal operating mode thereafter.

17. The method according to claim 16, further comprising the step of altering the operating mode of the receiver unit to a long preamble mode.

18. The method according to claim 1, wherein the power conserving mode defines a low power consumption mode of a radio frequency operating part.

19. The method according to claim 1, wherein the at least one transmitter, the at least one receiver or combinations thereof may form part of a node comprising a transceiver arrangement.

20. The method according to claim 1, wherein the communication system includes at least two nodes, each comprising at least a transmitter, a receiver or combinations thereof configured for wireless transmission.

21. The method according to claim 1, further comprising the step of selecting the time of transmission for a later signal randomly.

22. A communication system for transmission of signals, the communication system comprising:
   at least one transmitter configured to be able to include a message part indicative of a time of transmission for a later signal when transmitting a transmitter signal on a non-periodical basis at a time indicated by a previous signal transmitted from the transmitter and received by the receiver;
   at least one receiver including control means for performing a time control in dependence on the message part indicative of the time of transmission for the later signal; and
   means for facilitating a transition of one of the at least one transmitter, the at least one receiver or both the transmitter and the receiver from a power saving state, into the power saving state, or from and into the power saving state in dependence on the message part indicative of the time of transmission for the later signal, said means being configured to facilitate when no signal is being received.

23. The communication system according to claim 22, wherein the at least one transmitter and at least one receiver include means for timing.

24. The communication system according to claim 22, wherein the at least one receiver includes control means for switching between at least two modes of operation in dependence on a received message part indicative of the time of transmission for the later signal.

25. The communication system according to claim 22, wherein the at least one transmitter includes control means for switching between at least two modes of operation in dependence on a transmitted message part indicative of the time of transmission for the later signal.

26. The communication system according to claim 24, wherein the at least two modes of operation define a normal operating mode and a power conserving mode.

27. The communication system according to claim 26, wherein the power conserving mode defines a low power consumption mode of a radio frequency operating part.

28. The communication system according to claim 22, further comprising a battery power supply.

29. The communication system according to claim 22, further comprising control means for determining a lack of synchronicity and means for initiating a synchronization resumption process.

30. The communication system according to claim 22, characterized in that said system is designed to control operation of at least one transmitter and/or one receiver in at least one node of a communication system for transmission of signals, the method comprising the steps of:

transmitting a signal from a transmitter to a receiver at a time indicated by a previous signal transmitted from the transmitter and received by the receiver, the transmitter signal including a message frame having a message part indicative of a time of transmission for a later signal;

registering by the at least one receiver the message part indicative of the time of transmission for the later signal; and     facilitating a transition of one of the at least one transmitter, the at least one receiver or both the transmitter and the receiver from and into a power saving state when no signal is being conveyed.

31. The method according to claim 5, further comprising the step of receiving a confirmation signal from the receiver before bringing the transmitter into the power conserving mode.

32. The method according to claim 9, further comprising the step of transmitting a confirmation signal before bringing the receiver into the power conserving mode.

33. The method according to claim 32, further comprising the step of waiting for a retransmission time before the power conserving mode.

34. The method according to claim 21, wherein the time of transmission is selected from a predetermined interval.

35. The communication system according to claim 25, wherein the at least two modes of operation define a normal operating mode and a power conserving mode.

\* \* \* \* \*